United States Patent [19]

Badami

[11] Patent Number: 5,236,365
[45] Date of Patent: Aug. 17, 1993

[54] REPLICATED MAKE-UP PANEL FOR COUNTER DISPLAY

[75] Inventor: John Badami, Mineola, N.Y.

[73] Assignee: L'Oreal, A Societe Anonyme, Paris, France

[21] Appl. No.: 846,018

[22] Filed: Mar. 4, 1992

[51] Int. Cl.$^5$ .................... G09B 25/00; A45D 33/38
[52] U.S. Cl. ..................... 434/377; 434/99; 434/100; 132/294
[58] Field of Search ............ 132/319, 320, 314, 294; 434/99, 100, 377

[56] References Cited

U.S. PATENT DOCUMENTS

| | | | |
|---|---|---|---|
| 1,582,122 | 4/1926 | Clapp | 434/99 X |
| 1,741,080 | 12/1929 | Stenz | 434/100 |
| 1,960,668 | 5/1934 | Freedman | 434/100 |
| 1,964,274 | 6/1934 | Rodnon | 434/100 X |
| 3,851,655 | 12/1974 | Tarro | 132/294 |
| 4,561,850 | 12/1985 | Fabbri et al. | 434/100 X |
| 5,178,169 | 1/1993 | Lamle | 132/319 |

Primary Examiner—Robert P. Swiatek
Assistant Examiner—L. Thomas
Attorney, Agent, or Firm—Brumbaugh, Graves, Donohue & Raymond

[57] ABSTRACT

A replicating process and replicated element for simulating the color and texture of powdery substances such as cosmetics is provided. A pigment is mixed with a color match vehicle and placed on embossed paper by silk screening to reproduce a colored textured surface similar to the actual product. The replicated element is then placed on a display panel or an actual container in which the product is sold for display purposes.

17 Claims, 3 Drawing Sheets

REPLICATED MAKE-UP PANEL FOR COUNTER DISPLAY

FIELD OF THE INVENTION

The present invention relates to replicated powder elements used to duplicate the color and texture of powder elements such as facial cosmetics and a method for making such replicated powder elements.

BACKGROUND OF THE INVENTION

Sellers of powdered goods, such as facial cosmetics, have traditionally used real products (sometimes referred to as "live" products) to display their goods for sale. Replicated powdered goods have not been used because current replication techniques have failed to produce replicas which provide true color and texture representation of the goods they are intended to represent. This has been especially true in the cosmetics industry where customers are very sensitive to slight variations in color and texture of the goods they intend to purchase.

The current use of live products for display samples has several drawbacks. Live products tend to be expensive and require careful handling. Live products are subject to smudging, cracking, and discoloration whenever handled or transported. Even after they are placed in a display, as shown in FIG. 1, static electricity causes powder particles from the live products to attach to the inner walls of the display case and discolor other neighboring products. The live products are also subject to discoloration, breaking and cracking as a result of continued exposure to light and heat. Consequently, live products have a limited display life and must be replaced regularly, and tend to be positioned in closed, clear containers which affect viewing of the products.

Current duplication methods do not use color pigments which are used in the real products and have failed to produce replicas which provide a true representation of the real product's color and texture. One current replication technique involves the use of lithography to reproduce a replica of the "live" product. However, because the color coating produced by the lithography process is relatively thin the replicated elements tend to be glossy and are subject to discoloration. The thinness of the coating used in the lithography process prevents the use of the pigments which are used in the actual powders because the true pigments are too thick for the lithography process thereby making reproduction of the real powder's color difficult, if not impossible. The failure of current duplication methods to reproduce a true color and texture representation of the real products has forced retail sellers of the powder products to use "live" product displays despite their many drawbacks.

It is an objective of this invention to provide a powder replication method which produces a true representation of a powder element's color and texture. It is a further objective of this invention to provide a replication method which provides replicas that do not fade, smudge or crack upon exposure to light, heat or handling.

It is a further objective of this invention to provide a display panel which uses a plurality of such replicated elements to display a number of products so as to reproduce a comparative viewing of the different colors and textures of the various powdered products available.

SUMMARY OF THE INVENTION

The present invention accomplishes the above objectives by providing a method for making a replica of a powder product comprising the steps of mixing a pigment used in the real powder in a color match vehicle, embossing a sheet of paper to create a desired textured appearance and then coloring the embossed sheet of paper with the mixed pigment and color match vehicle.

According to the present invention, a counter display panel is also provided in which the replicated sheet described above is disposed on a base and inserted into a cavity provided in the counter display and attached therein. The counter display is provided with a plurality of such cavities for receipt of a plurality of replicated elements.

BRIEF DESCRIPTION OF THE DRAWINGS

In order to describe the invention more fully, reference will now be made to the following listed drawings, wherein.

DETAILED DESCRIPTION

The current invention will be explained as applied to facial cosmetic powders such as "Blushing Powders" for the purpose of providing a full explanation of how the invention is to be carried out. However, it should be understood to those skilled in the art that the current invention could be used in other applications in which reproduction of powdery substances is desired.

Figure 1:
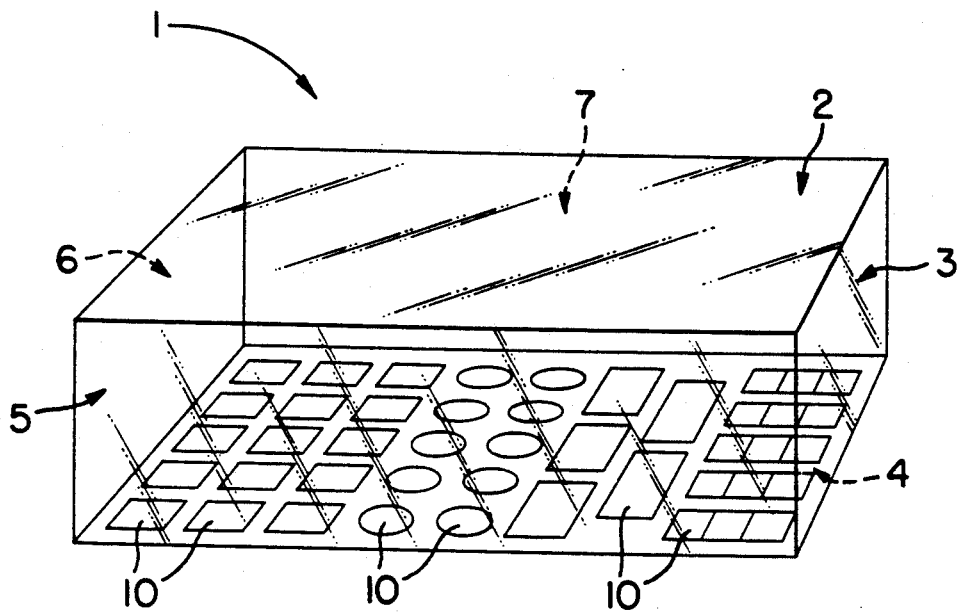
FIG. 1 is an elevational side view of a prior art display case for cosmetic powders.

FIG. 1 shows a prior art display case 1 for facial cosmetics as commonly seen in department stores and other places where such makeup is sold. The individual powder elements 10 are located on the base 4 of the display case 1. The individual elements 10 are commonly called "live" products, as explained above and tend to be displayed in either the compact within which they are to be sold (not shown) or are positioned within cut-out slots provided in the base 4 as shown in FIG. 1. The display case 1 is commonly provided with a glass, or plexiglass, top panel 2, front panel 5 and side panels 3 and 6 to avoid smudging, discoloration and deformation of the elements 10 in the display case 1. The rear portion 7 is commonly made removable so that sales persons may clean or replace any products which are in poor condition.

Figure 2:
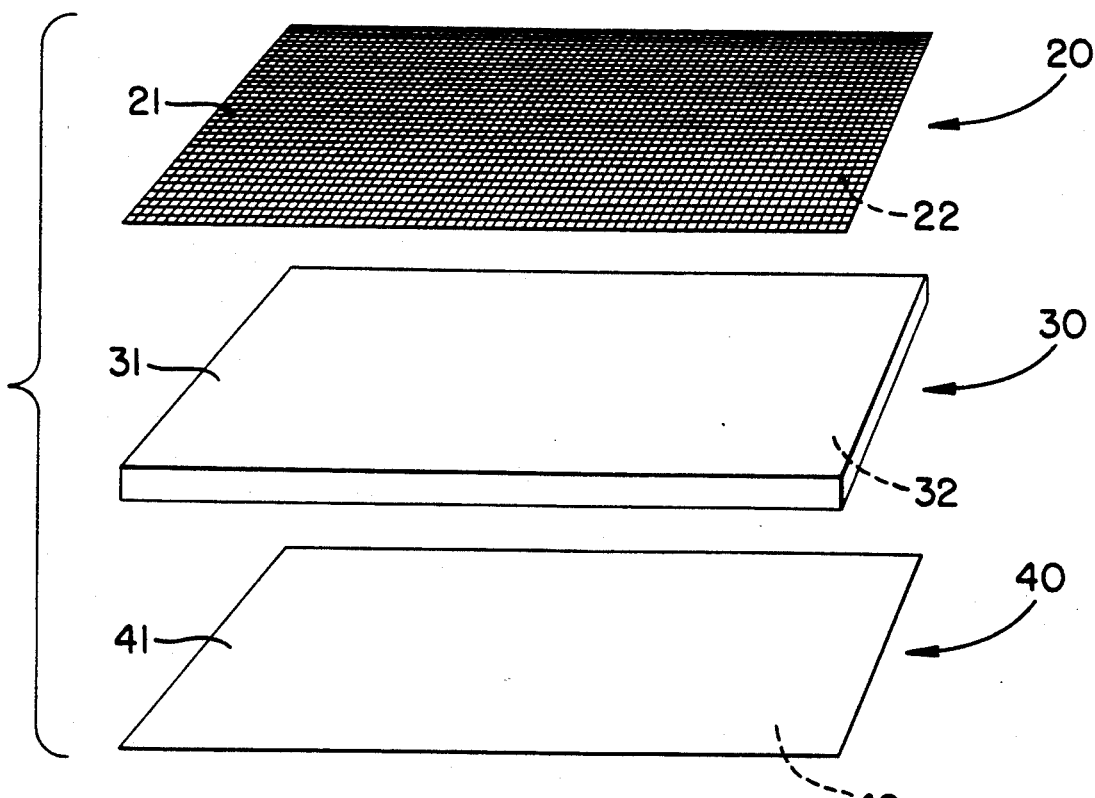
FIG. 2 is an expanded view of an embodiment of the present invention.

FIG. 2 shows one embodiment of a replicated powder element according to the present invention. Top piece 20 is a piece of paper having a top side 21 and a bottom side 22. The top side 21 is treated to reproduce the color and texture of a desired facial cosmetic product, as discussed in more detail below, and represents the portion of the replicated element to be displayed for viewing. The bottom side 22 of the top piece 20 is attached to the top portion 31 of a stabilizing piece 30. The pieces 20 and 30 are glued together by any of a number of known adhesion methods, such as pressure sensitive adhesion mounting. The stabilizing piece 30 is selected to provide support to the top portion 20, and may also be selected to provide varying levels of height from the base of a panel. The stabilizing piece 30 may also provide varying degrees of compression so that the softness of the replicated powder element when touched may be varied.

In the embodiment shown in FIG. 2, a double-sided piece of adhesion tape 40 is further provided which attaches the glued [25] portion 20 and stabilizing piece 30 to a desired surface. The double-sided piece of adhesion tape 40 has two sides 41 and 42 which are provided with contact glue. Side 41 of adhesion tape 40 is attached to side 32 of the stabilizing piece 30 and bottom side 42 of the adhesion tape 40 attaches the replicated element to the desired surface.

Reproduction of the color and texture of a powdery substance requires several steps resulting in a top piece 20 treated to simulate the texture of the real powder product and to provide an appropriate color and level of light diffraction so as to not produce an unnatural glossy or flat appearance.

The actual color and weight of the paper used for top piece 20 may vary for different applications. For example, in facial cosmetics such as "Blushing Powder" either an 80 lb. or 100 lb. weight bright white paper may be used depending on the appearance of the powder which is to be reproduced. An example of one such paper is "Vintage Velvet" produced by the Lincoln Myers Company which has mills across the United States.

Once selected, the paper is then embossed to give it a texture similar to the powder element which is being replicated as exemplified by the hatch lines on top piece 20. The embossed paper 20 is then treated with an appropriate coloring agent. The coloring agent is a mixture of a pigment and a color matching vehicle, such as ink. The pigment is preferably identical to that used in the actual powder product, i.e., uses same color proportions and color materials, but the use of a color match vehicle in the coloring agent generally requires a slight variation on the original proportion of pigments to produce an exact match. A true color is produced by adjusting the amount of pigment(s) used in the mixture to offset the use of the color matching vehicle.

The use of a powder pigment identical to that used in the real powders, such as "Mearl Pearl" mica flakes which is commonly used in eye cosmetics, produces a coloring agent having large particles included therein. Because of these large particles, the coloring agent cannot be applied with standard lithography techniques. Accordingly, the application of the coloring agent onto the embossed paper requires a technique that permits the application of a thick coating of coloring agent. The preferred method of applying the coloring agent to the embossed paper is by traditional silk screening methods. Silk screening permits the application of a thick coat of coloring agent onto the embossed paper at a reasonable cost.

The examples provided herein are intended to be illustrative of the invention. The paper, pigment and color carrier used may vary according to the powder which is being reproduced. However, it has been found preferable to select a paper which is bright white and which reflects light in a manner comparable to the real product. It has also been found preferable to use a pigment or pigment combinations identical to that used in the real product.

In cases where a plurality of such replicas are to be made, it has been found preferable to make a single, large sheet of a desired color and texture, then attach a large stabilizer piece 30 and a large piece dual sided adhesive tape 40, as shown in FIG. 2, and then die cut the appropriate pieces needed. The large sheet is easier to handle during the production process and provides more consistent results.

Figure 3:
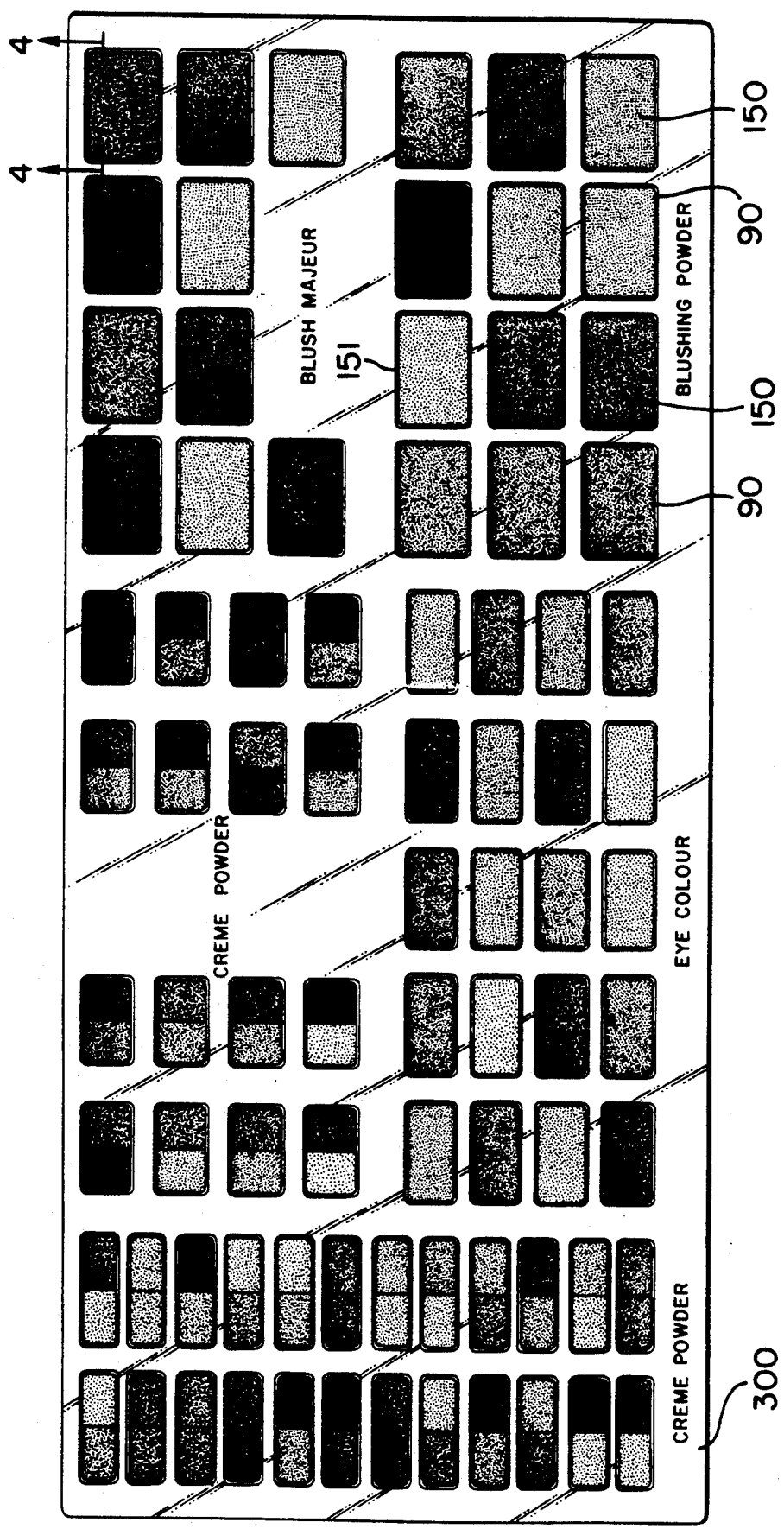
FIG. 3 is an elevational view of a display panel of the present invention.
Figure 4:
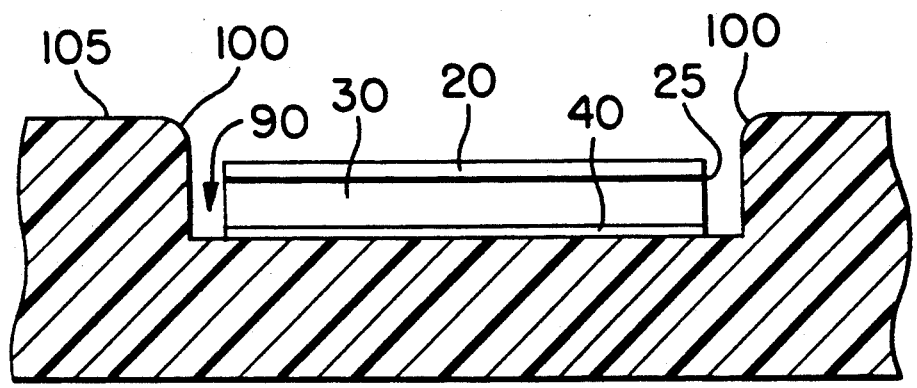
FIG. 4 is an expanded view of cross-section 4—4 in FIG. 3 showing a cavity of a display panel including a replicated element of the current invention.

Once the replicated display pieces are produced, they may be placed on a desired surface or display panel as shown in FIG. 3. In the case of facial cosmetics, it has been found preferable to place such replicated pieces in cavities as shown in FIG. 4, which shows a cross-section 4—4 of a cavity shown in FIG. 3. Cavity 90 has beveled top edges 100 and top surface 105. The placement of the replicated display piece in the cavity 90 reproduces the setting of the powders as they would appear in their individual compacts when purchased. It is also preferred that the die cut replicated pieces are similar in shape and size to the original product. These steps further aid in producing a more attractive replicated product which more truly resembles the real product.

Figure 5:
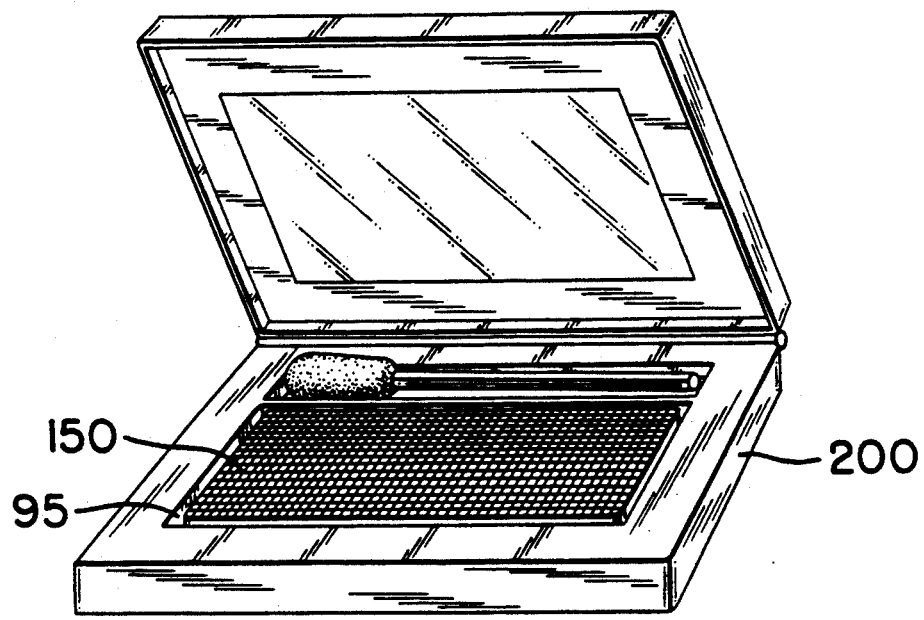
FIG. 5 is an elevational side view of a cosmetic compact having a replicated element of the current invention therein.

In cases where a display of the cosmetic in its compact is desired, the replicated pieces may be placed in a compact 200 as shown in FIG. 5. The replicated element 150 is simply inserted into cavity 95 of the compact 200. This would effectively reproduce the real product in the form that it would be purchased for display. The replicated element would again provide the advantage of longer life and cleaner display, i.e. no dust on the compact mirror and no smudging after handling.

Referring back to FIG. 3 for a more detailed description, a counter display panel 300 is shown embodying the present invention. The panel 300 is provided with a plurality of cavities 90 in which replicated powder elements 150 are placed. The counter display panel 300 may be of any color or material; however, it is preferred that the panel be transparent plexiglass, so as not to detract from the individual colors of the replicated elements and to ensure that the panel is manageable to maneuver.

As shown in FIG. 3, a number of different products may be displayed in a single panel 300. The same type of products, i.e. Blushing Powders and Powder Eye Color, are preferably grouped together to show variations in color available within a product line.

The individual replicated elements may also include more than one color and/or texture as shown in replicated elements 151. Some cosmetic powders are sold as such and this could also be duplicated in the silk screen process described above and displayed on the panel 300 as shown in FIG. 3. Different products and individual colors could also be marked to identify them to a viewer. Such markings could be made by silk screening methods onto the top surface of base 300 or by simply placing an adhesive label to the display panel 300.

The replicated elements described herein provide the advantage of being less expensive than real powder products. They can be handled without smudging, cracking or discoloration and can be shown to customers without worry of disrupting the appearance of the display elements.

The above examples have been provided to better explain the invention. Any person of ordinary skill in the art could make variations on the described examples without departing from the spirit and scope of the invention. For instance, the dual sided tape 40 in FIGS. 2 and 4 could easily be replaced with a spray glue on the bottom of a stabilizing element 30, or the stabilizing element 30 could be replaced by applying the top piece 20 onto a ledge provided in a cavity. The invention as described could also be used to produce children's toys in which replicated makeup or other replicated powdery substances are used.

I claim:

1. A counter display panel for displaying replicas of a powdered facial cosmetics, comprising a support base and means for holding one or more replicating elements, each of said replicating elements comprising an embossed paper base and a coloring agent treated on said embossed paper, wherein each of said replicating elements replicates a color and texture representative of one of said powdered facial cosmetics.

2. A display panel as described in claim 1, wherein said coloring agent comprises a powder pigment and a color matching vehicle.

3. A display panel as described in claim 2 wherein said pigment is a mica flake pigment.

4. A display panel as described in claim 3 wherein said color matching vehicle is ink.

5. A display panel as described in claim 1 wherein said coloring agent is placed on said embossed paper by means of a silk screening method.

6. A display panel as described in claim 1, wherein said support base is a plexiglass base.

7. A display panel as described in claim 6, wherein said plexiglass support base is transparent.

8. A display panel as described in claim 1, wherein said support base comprises a first surface cavities having a beveled edge.

9. A display panel as described in claim 8, further comprising identifying markings for each of said cavities, said markings being indicative of said colored texture material represented by said replicated textured elements located within said cavity.

10. A method for producing a replica of a powdered facial cosmetic comprising the steps of embossing a sheet of paper to create a general textured appearance replicating said powdered facial cosmetic, creating a coloring agent matching the color of said powdered face cosmetic by mixing a powder pigment with a color matching vehicle, and treating said sheet of paper with said coloring agent.

11. A method of producing a replica of a powdered facial cosmetic as described in claim 10, wherein the color match vehicle is ink.

12. A method of producing a replica of a powdered facial cosmetic as described in claim 10, further comprising the step of placing the colored embossed paper onto a support base.

13. A method of producing a replica of a powdered facial cosmetic as described in claim 22, wherein the mixed color pigment and color match vehicle are applied on the embossed sheet of paper by a silk screen process.

14. A replicating element simulating the color and texture of a powdery substance comprising an embossed paper base treated with a coloring agent of a powder pigment and a color matching vehicle, whereby the color and texture of the powdery substance is replicated.

15. The element of claim 14 further including a support base attached to the underside of said embossed paper base for supporting said embossed paper.

16. The element of claim 14 wherein said pigment is a mica flake pigment.

17. The element of claim 15 wherein said color matching vehicle is ink.

* * * * *

UNITED STATES PATENT AND TRADEMARK OFFICE
CERTIFICATE OF CORRECTION

PATENT NO. : 5,236,365
DATED     : August 17, 1993
INVENTOR(S) : John Badami

It is certified that error appears in the above-indentified patent and that said Letters Patent is hereby corrected as shown below:

On the title page, item [56], the following references should be inserted.

| | | | |
|---|---|---|---|
| 4,848,378 | 7/1989 | Moir, et al | 132/319 |
| 4,751,934 | 6/1988 | Moir, et al | 132/319 |
| 4,995,408 | 2/1991 | Wallschlaeger | 132/320 |
| 4,421,127 | 12/1983 | Geer | 132/83R |
| 2,623,304 | 12/1952 | Watson | 434/100 |
| 1,974,466 | 9/1934 | Marshburn | 434/100X |

Column 3, line 11, "portion" should read --top portion--.
Column 5, line 35, "cavities" should read --and further includes cavities--.
Column 6, line 20, "claim 22" should read --claim 11--.

Signed and Sealed this

Twenty-sixth Day of April, 1994

BRUCE LEHMAN

Attest:

Attesting Officer

Commissioner of Patents and Trademarks